United States Patent
Xu

(10) Patent No.: US 9,565,630 B2
(45) Date of Patent: Feb. 7, 2017

(54) ENERGY SAVING METHOD, USER EQUIPMENT AND NETWORK-SIDE NETWORK ELEMENT

(71) Applicant: ZTE CORPORATION, Shenzhen, Guangdong Province (CN)

(72) Inventor: Hui Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 106 days.

(21) Appl. No.: 14/427,797

(22) PCT Filed: Aug. 12, 2013

(86) PCT No.: PCT/CN2013/081297
§ 371 (c)(1),
(2) Date: Apr. 13, 2015

(87) PCT Pub. No.: WO2014/040463
PCT Pub. Date: Mar. 20, 2014

(65) Prior Publication Data
US 2015/0223165 A1     Aug. 6, 2015

(30) Foreign Application Priority Data
Sep. 17, 2012 (CN) .......................... 2012 1 0344129

(51) Int. Cl.
*H04W 52/02* (2009.01)

(52) U.S. Cl.
CPC ........... *H04W 52/0212* (2013.01); *Y02B 60/50* (2013.01)

(58) Field of Classification Search
CPC .. H04W 52/00; H04W 52/02; H04W 52/0209; H04W 52/0212; H04W 52/0216; H04W 52/0225; H04W 52/0229; H04W 52/0235; H04W 52/0251; H04W 52/0274
See application file for complete search history.

(56) References Cited

U.S. PATENT DOCUMENTS

| 7,773,549 B2 * | 8/2010 | Shin ................... H04L 12/1877 370/312 |
| 2009/0059829 A1 * | 3/2009 | Bachmann ........ H04W 52/0235 370/311 |

(Continued)

FOREIGN PATENT DOCUMENTS

| CN | 1714586 A | 12/2005 |
| CN | 102316440 A | 1/2012 |

(Continued)

OTHER PUBLICATIONS

European Search Report issued Sep. 1, 2015 in European Patent Application No. EP13837959.

*Primary Examiner* — Curtis A Alia
(74) *Attorney, Agent, or Firm* — Plumsea Law Group, LLC

(57) ABSTRACT

Disclosed are a power-saving method, a user equipment and a network-side network element which can reduce power consumption of UEs. The power saving method includes: a user equipment (UE) requesting to enter into a power-saving state or a network-side network element indicating the UE to enter into the power-saving state; and the UE entering into the power-saving state, wherein the power-saving state refers to a state in which the UE cannot respond to paging information sent by the network side, but can send a service request and perform periodic location update. A UE includes a sending module and a processing module. Another UE includes a receiving module and a processing module. The network-side network element includes a configuring module and a storing module.

16 Claims, 4 Drawing Sheets

(56) References Cited

U.S. PATENT DOCUMENTS

2010/0184458 A1 7/2010 Fodor et al.
2010/0279676 A1 11/2010 Benn et al.

FOREIGN PATENT DOCUMENTS

| CN | 102487541 A | 6/2012 |
| --- | --- | --- |
| EP | 2487973 A1 | 8/2012 |
| WO | 2011/084024 A2 | 7/2011 |
| WO | 2012/053841 A2 | 4/2012 |

* cited by examiner

ENERGY SAVING METHOD, USER EQUIPMENT AND NETWORK-SIDE NETWORK ELEMENT

CROSS-REFERENCE TO RELATED APPLICATION(S)

This application is the U.S. National Phase application of PCT application number PCT/CN2013/081297 having a PCT filing date of Aug. 12, 2013, which claims priority of Chinese patent application 201210344129.5 filed on Sep. 17, 2012, the disclosures of which are hereby incorporated by reference.

TECHNICAL FIELD

The present document relates to mobile communication technology, and more particularly, to a power-saving method, a user equipment and a network-side network element.

BACKGROUND OF THE RELATED ART

M2M (Machine to Machine) refers to all technologies and means to establish a connection between machines. The M2M concept appeared in the last century ninety's, but it only stayed in the theoretical stage. After 2000, with the development of mobile communication technology, using the mobile communication technology to achieve networking of machines becomes possible. The M2M service appeared on the market around 2002, and following a rapid development in the subsequent years, it became the focus of many communication equipment providers and telecom carriers. Currently the number of machines around the world is much more than the number of people, good market prospects of M2M technology, therefore, can be foreseen.

The study on M2M communication application scenarios indicates that providing the M2M communication in the mobile network has a promising market prospect. But the M2M service raised a lot of new requirements on the system, and in order to enhance competitiveness of the mobile network in this aspect, it is necessary to optimize the existing mobile network to more effectively support the M2M communication.

Related mobile communication networks are mainly designed for man-to-man communications, but they are not optimized enough for machine-to-machine communications or man-to-machine communications. Furthermore, how the carriers can offer the M2M communication service at a low cost is also the key to the success of M2M communication deployment.

Based on the above situation, it is necessary to study solutions for a mobile network supporting the M2M communication, and the solutions should maximize the reuse of existing networks, reduce the impact of a large number of M2M communications on the network as well as the complexity of operation and maintenance.

Currently, the telecom market is increasingly competitive, the tariffs are declining, and the carriers' profit margins continue to decrease, and the people-based communication market is being saturated, and the M2M is a totally new development opportunity for the carriers.

In order to effectively utilize the mobile network resources, the 3rd Generation Partnership Project (referred to as 3GPP) proposes machine type communication (called MTC), namely Machine-to-Machine and Machine-to-Man communication services, and its service scope is far beyond the previous Human-to-Human (referred to as H2H) communication, and the MTC is very different from the current H2H communication mode in aspects of access control, billing, security, quality of service (referred to as QoS), and service modes and so on.

The architecture of 3GPP Evolved Packet System (referred to as EPS) is shown in FIG. 1, and it can be seen from FIG. 1 that the EPS comprises a radio access network and a core network, wherein the radio access network, for example, comprises UTRAN (Universal Terrestrial Radio Access Network), E-UTRAN (Evolved UTRAN) and GERAN (GSM/EDGE Radio Access Network); the core network, for example, comprises network elements such as MME (Mobility Management Entity), S-GW (Serving Gateway) and P-GW (Packet Data Network Gateway, referred to as PDN gateway) in the EPC (Evolved Packet Core), and it comprises network elements such as SGSN (Serving GPRS Support Node) in the GPRS (General Packet Radio Service) core network; and it comprises the eNB (evolved Node B) in the E-UTRAN.

For a battery-powered MTC UE (User Equipment), measures need to be taken to reduce power consumption of the UE, and for a MTC UE with the power supply, the power consumption of the UE also needs to be reduced in order to achieve the goal of green power-saving. Currently, with the increasing popularity of intelligent phones, there are a large number of applications running on intelligent phones, and these applications may increase battery power consumption of the intelligent phones and shortened the battery life, therefore the power-saving of an intelligent phone is a key issue must to be addressed.

In the Access Stratum (called AS), a LTE (Long Term Evolution) UE has two RRC (Radio Resource Control) states: RRC Idle and RRC Connected, referred to as idle state and connected state; in the non-access stratum (referred to as NAS), the LTE UE has three states: LTE Detached, LTE Idle and LTE Active, wherein the LTE Idle and the LTE Active respectively correspond to the RRC Idle and the RRC Connected, and the LTE Detached refers to the state that the UE is just started up, at this time there is no context of the UE and location of the UE is an unknown at the network side. When sending data, the UE needs to enter into the connected state, and when receiving data, the UE needs to be in the idle state or the connected state, and the UE in the LTE Detached cannot send or receive data. The correspondence between the AS state and the NAS state of the LTE UE is shown in FIG. 2, wherein the LTE Detached does not have a corresponding RRC state.

In the research and practice process of the related art, the following problems are found in the related art: both the MTC UE and the intelligent phones have power-saving needs, but for how to find a power saving method from the perspective of the system and how to reduce the signaling interaction between the UE and the network side, etc., there are currently no solutions.

SUMMARY OF THE INVENTION

To solve the technical problem, the embodiment of the present invention is to provide a power-saving method, a user equipment and a network-side network element, to reduce power consumption of UEs.

To solve the abovementioned technical problem, the embodiment of the present invention provides a power-saving method, comprising:

a User Equipment (UE) requesting to enter into a power-saving state, or a network-side network element indicating the UE to enter into the power-saving state;

the UE entering into the power-saving state, wherein the power-saving state refers to a state in which the UE cannot respond to paging information sent by a network side but can send a service request and perform a periodic location update.

Alternatively, the method further comprises: a UE in the power-saving state exiting the power-saving state and sending a service request to a network-side network element when having uplink data or signaling to be sent.

Alternatively, the method further comprises: when a periodic location update timer expires, the UE in the power-saving state exiting the power-saving state and performing a location update, and reentering into the power-saving state after the location update is completed.

Alternatively, the UE requesting to enter into the power-saving state comprises: the UE sending power-saving request information to the network-side network element, wherein the power-saving request information is used for requesting to enter into the power-saving state.

Alternatively, the network-side network element indicating the UE to enter into the power-saving state comprises: the network-side network element sending power-saving indication information to the UE, wherein the power-saving indication information is used for indicating the UE to enter into the power-saving state.

Alternatively, after the UE enters into the power-saving state, the method further comprises: the UE entering into the idle state after the power-saving state timer expires.

Alternatively, the UE entering into the power-saving state comprises: the UE staying in the idle state for a preset time period and then entering into the power-saving state, and the preset time period is configured and notified to the UE by the network-side network element.

To solve the abovementioned technical problem, the embodiment of the present invention further provides a user equipment (UE) for implementing saving power, comprising a sending module and a processing module, wherein:

the sending module is configured to send power-saving request information to a network side to request to enter into a power-saving state;

the processing module is configured to make the UE enter into the power-saving state, wherein the power-saving state refers to a state in which the UE cannot respond to paging information sent by a network side but can send a service request and perform a periodic location update.

Alternatively, the processing module is further configured to make the UE exit the power-saving state and send a service request to a network-side network element when the UE in the power-saving state has uplink data or signaling to be sent.

Alternatively, the processing module is further configured to: after a periodic location update timer expires, make the UE in the power-saving state exit the power-saving state and perform a location update, and make the UE re-enter into the power-saving state after the location update is completed.

Alternatively, the processing module is further configured to make the UE enter into an idle state after the power-saving state timer expires.

Alternatively, the processing module is configured to make the UE enter into the power-saving state, comprising: the processing module being configured to make the UE stay in the idle state for a preset time period and then enter into the power-saving state, wherein the preset time period is configured and notified to the UE by the network-side network element.

To solve the abovementioned technical problem, the embodiment of the present invention further provides a user equipment (UE) for implementing saving power, comprising a receiving module and a processing module, wherein:

the receiving module is configured to receive power-saving indication information sent by a network side network element to a UE;

the processing module is configured to make the UE enter into the power-saving state, wherein the power-saving state refers to a state in which the UE cannot respond to paging information sent by a network side but can send a service request and perform a periodic location update.

Alternatively, the processing module is further configured to make the UE exit the power-saving state and send a service request to the network-side network element when the UE in the power-saving state has uplink data or signaling to be sent.

Alternatively, the processing module is further configured to make the UE in the power-saving state exit the power-saving state and perform a location update after a periodic location update timer expires, and make the UE re-enter into the power-saving state after the location update is completed.

Alternatively, the processing module is further configured to make the UE enter into an idle state after the power-saving state timer expires.

Alternatively, the processing module is configured to make the UE enter into the power-saving state, comprising: the processing module being configured to make the UE stay in the idle state for a preset time period and then enter into the power-saving state, wherein the preset time period is configured and notified to the UE by the network-side network element.

To solve the abovementioned technical problem, the embodiment of the present invention further provides a network-side network element for implementing saving power, comprising a configuring module and a storing module, wherein:

the configuring module is configured to set time of a power-saving state timer for a user equipment (UE);

the storing module is configured to store context information of a UE when the UE is in the power-saving state. Alternatively, the network-side network element further comprises a sending module, which is configured to send power-saving indication information to the UE, wherein the power-saving indication information is used for indicating the UE to enter into the power-saving state.

The embodiments of the present invention can be used to reduce power consumption of UEs, reduce the signaling interaction between a UE and a network side, and achieve power-saving needs.

PREFERRED EMBODIMENTS OF THE INVENTION

Hereinafter in conjunction with the accompanying figures, the embodiments of the present invention will be described in detail. It should be noted that in the case of no conflict, embodiments of the present application and features in the embodiments may be arbitrarily combined with each other.

The First Embodiment

Figure 1:
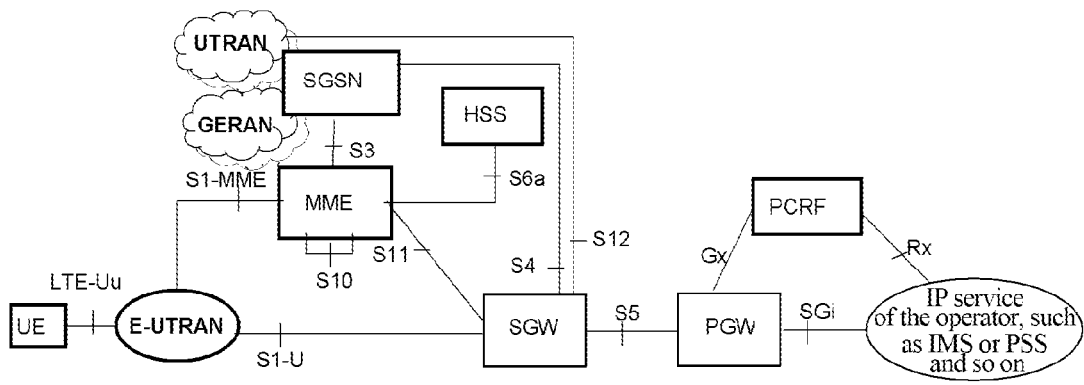
FIG. 1 is a schematic diagram of a 3GPP EPS architecture.
Figure 2:
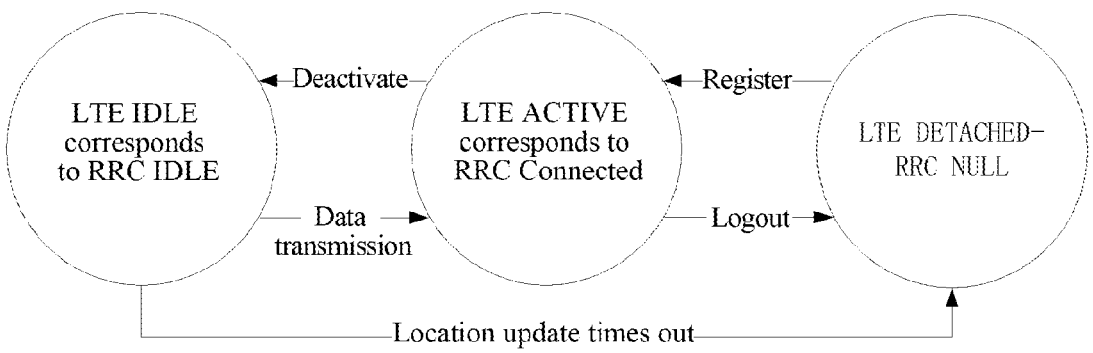
FIG. 2 is a schematic diagram of state transition between the LTE AS and NAS.
Figure 3:
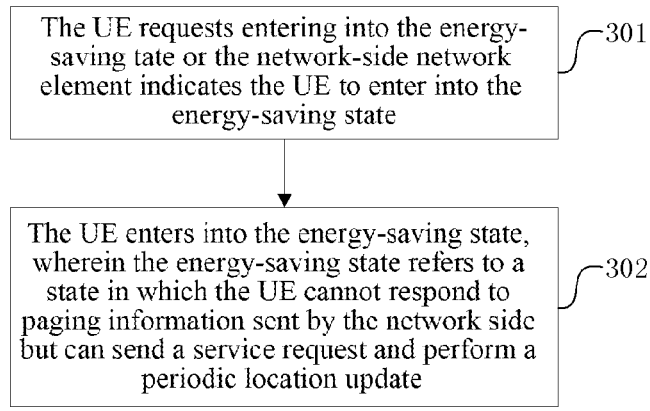
FIG. 3 is a flow chart of a first embodiment of the present invention.

The power-saving method in accordance with the present embodiment is shown in FIG. 3, comprising the following steps:

in step 301, the UE requests to enter into the power-saving state or the network-side network element indicates the UE to enter into the power-saving state;

the UE request refers to that the UE sends power-saving request information to the network side network element, or the user indicates the UE to send power-saving request information to the network-side network element, wherein the power-saving request information is used for requesting to enter into the power-saving state. The power-saving request information comprises one or more of the following contents: UE identifier, power-saving state enabling identifier and time period of power-saving state. The UE identifier can be any one of the following: IMSI (International Mobile Subscriber Identifier), MSISDN (Mobile Station international ISDN number) or UE external identifier; the power-saving state enabling identifier is used to indicate the UE to be ready to enter into the power-saving state; the time period of power-saving state is used to indicate the length of time that the UE is ready to stay in the power-saving state.

The network-side network element refers to one or more of the following network elements: base station, MME and SGSN; the network side indicating refers to: the network side sending the UE power-saving indication information for indicating the UE to enter into the power-saving state; the power-saving indication information comprises one or more of the following contents: UE identifier, power-saving state identifier and time period of the power-saving state. The UE identifier may be the identifier of an individual UE, or the identifiers of a class of UEs, such as the identifiers of UEs with low priority, and the like.

The abovementioned length of time of the power-saving state can be notified to the UE by the network side in advance, such as through broadcasting system information. If the UE requests or the network side indication message does not comprise the time period of the power-saving state, a default length of time can be used. Usually, the network side and the UE respectively save one timer configured to record the time period for the UE being in the power-saving state.

In step 302, the UE enters into the power-saving state, wherein the power-saving state refers to a state in which the UE cannot respond to paging information sent by the network side but can send a service request and perform a periodic location update.

Figure 4:
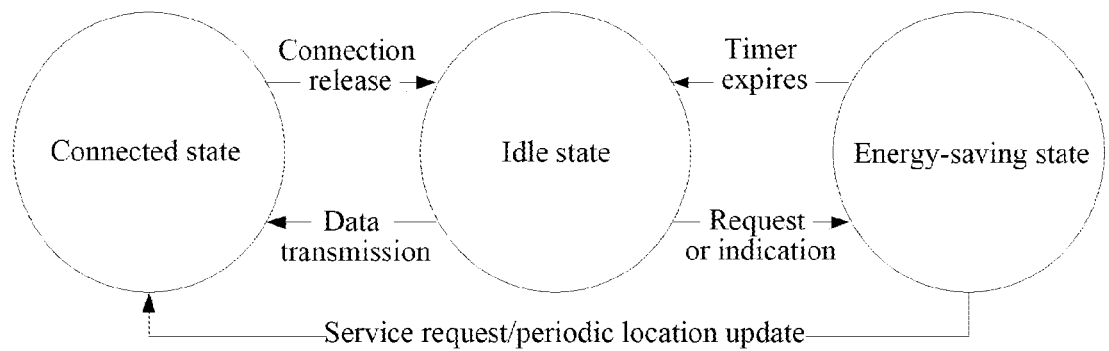
FIG. 4 is a schematic diagram of a state transition of a UE.

The power-saving state of the UE according to the present application is different from the idle state and the connected state of the UE, and the relationship among these three states is shown in FIG. 4, wherein the UE in the power-saving state enters into the idle state after the timer expires, and the UE in the idle state enters into the power-saving state via a request or an indication from the network side.

For a UE, the UE in the power-saving state closes the receiving circuit and the sending circuit, and it cannot respond to paging information sent by the network side or receive system information, but it has the capabilities of sending a service request and performing a periodic location update when necessary. Sending a service request, for example: when the UE has uplink data or signaling to be sent, the UE exits the power-saving state at this moment and initiates a service request process, comprising sending a service request to the network-side network element, and after the service request process ends, the UE may return to the power-saving state or may not return to the power-saving state. The UE in the power-saving state performing a periodic location update refers to: when the periodic location update timer expires, the UE exiting the power-saving state and performing a location update, and reentering into the power-saving state after the location update is completed.

For the network side, the network-side network element saves context information of the UE when the UE is in the power-saving state.

One preferred solution is that, after allowed to enter into the power-saving state or indicated to enter into the power-saving state, the UE firstly stays in the idle state for a preset time period and then enters into the power-saving state, and the preset time period is configured and notified to the UE by the network-side network element.

The Second Embodiment

The present embodiment introduces a UE for achieving the abovementioned method.

Figure 5:
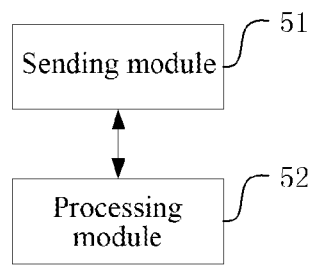
FIG. 5 is a structural schematic diagram of a UE in accordance with a second embodiment of the present invention.

One UE is shown in FIG. 5, comprising a sending module 51 and a processing module 52, wherein:

the sending module 51 is configured to send power-saving request information to the network side to request to enter into the power-saving state;

the processing module 52 is configured to make the UE enter into the power-saving state, wherein the power-saving state refers to a state in which the UE cannot respond to paging information sent by the network side but can send a service request and perform a periodic location update.

Figure 6:
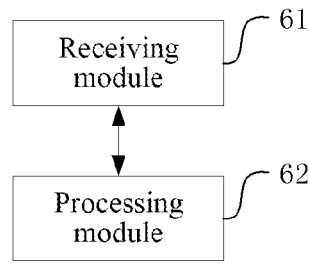
FIG. 6 is a structural schematic diagram of another UE in accordance with the second embodiment of the present invention.

Another UE is shown in FIG. 6, comprising a receiving module 61 and a processing module 62, wherein:

the receiving module 61 is configured to receive power-saving indication information sent by the network-side network element to the UE;

the processing module 62 is configured to make the UE enter into the power-saving state, wherein the power-saving state refers to a state in which the UE cannot respond to paging information sent by the network side but can send a service request and perform a periodic location update.

In one preferred embodiment, the abovementioned processing module 52 and processing module 62 may be modules with the same functions, that is, one UE may have the sending module 51, the receiving module 61 as well as the processing module 52 or 62 at the same time. In the following, the description of the processing module applies to both the processing module 52 and the processing module 62.

In order to make the UE in the power-saving state have the capability of sending a service request, the processing module can be configured to make the UE exit the power-saving state and send a service request to the network-side network element when the UE in the power-saving state has uplink data or signaling to be sent.

In order to make the UE in the power-saving state have the capability of performing a periodic location update, the processing module may be configured to, after the periodic location update timer expires, make the UE in the power-saving state exit the power-saving state and perform a location update, and make the UE re-enter the power-saving state after the location update is completed.

In order to make the UE in the power-saving state be able to exit the power-saving state, the processing module may be configured to make the UE enter into the idle state after the power-saving state timer expires.

In one preferred embodiment, the processing module may also be configured to, when making the UE enter into the power-saving state, make the UE firstly stay in the idle state for a preset time period and then enter into the power-saving state, wherein the preset time period is configured and notified to the UE by the network-side network element.

The Third Embodiment

Figure 7:
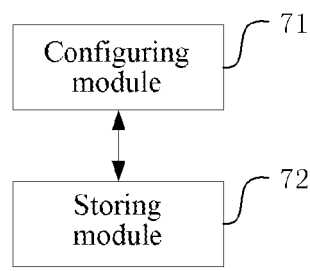
FIG. 7 is a structural schematic diagram of a network-side network element in accordance with a third embodiment of the present invention.

The present embodiment introduces a network-side network element for achieving the method according to the abovementioned first embodiment. As shown in FIG. 7, it comprises a configuring module 71 and a storing module 72, wherein:

the configuring module 71 is configured to set time of a power-saving state timer for the UE;

the storing module 72 is configured to store the context information of the UE when the UE is in the power-saving state.

The power-saving state of the UE in this example refers to a state in which the UE cannot respond to paging information sent by the network side but can send a service request and perform periodic location update.

In one preferred embodiment, the network-side network element further comprises a sending module, which is configured to send power-saving indication information to the UE, wherein the power-saving indication information is used to indicate the UE to enter into the power-saving state.

In the following, specific application examples are used to further describe the present application.

Application Example 1

Figure 8:
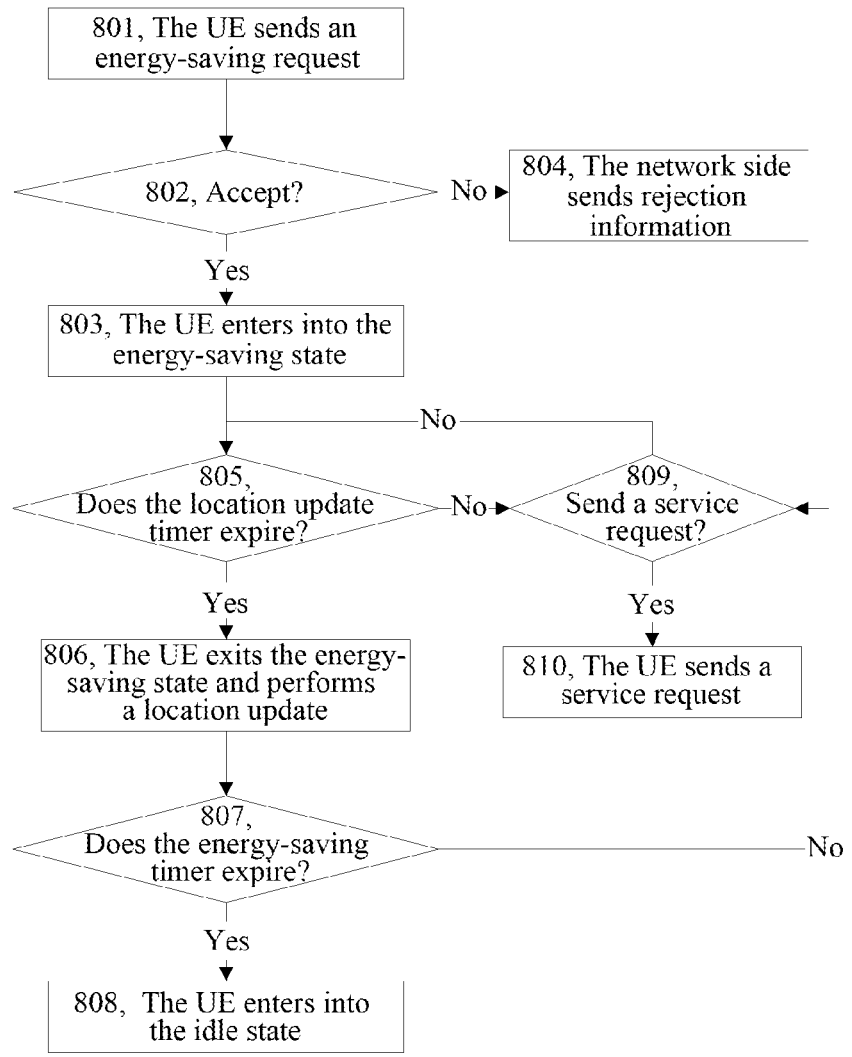
FIG. 8 is a flow chart of a first application example in accordance with the patent document.

This example is for a scenario in which the UE sends a request to the network side, the power-saving method is shown in FIG. 8 and comprises:

in step 801, the user equipment (UE) requests to enter into the power-saving state;

herein the user equipment may be any one of the following: MTC UE, intelligent terminal; the MTC UE refers to a UE with the MTC function; the intelligent terminal comprises an intelligent phone, network card, or the like.

The UE can actively send power-saving request information or the user operates the UE to send power-saving request information.

The power-saving request information comprises one or more of the following contents: UE identifier, power-saving state enabling identifier and time period of power-saving state. The time period of power-saving state can be configured and notified in advance to the UE by the network side.

The abovementioned power-saving request information is sent to the network-side network elements (hereinafter referred to as network side), and the network side comprises one or more of the following: base station, MME and SGSN.

in step 802, the network side judges whether to accept the power-saving request from the UE or not, if yes, proceeding to step 803, otherwise proceeding to step 804;

the network side judges whether to accept the UE request according to the needs, and if the network side has downlink data to be sent to the UE, the network side may reject the UE request. If the network side allows the UE to enter into the power-saving state, the UE can be notified via a default mode, for example, if a rejection response is not returned within a specified time period, the UE considers that the network side allows it to enter into the power-saving state.

In step 803, the UE enters into the power-saving state.

One preferred embodiment is: the UE firstly enters into the idle state and then enters into the power-saving state, and it stays in the idle state for a preset time period of Ti, wherein Ti is configured and notified to the UE in advance by the network side, such as by broadcasting and sending system information to the UE; the function of Ti is to leave a cushioning time period before formally entering into the power-saving state, and during this time period, the UE may transmit or receive data, and if the network side accepts the UE request, during the time period Ti, the network side does not send response information, and the UE directly enters into the power-saving state after the Ti ends.

The UE closes the sending circuit and the receiving circuit in the power-saving state, but the UE does not shut down or detach from the network, at this time, the network side saves the context of the UE until the UE updates the location or sends a service request.

The movement of the UE in the power-saving state does not trigger a location update process.

In step 804, the network side sends rejection information and indicates the reason for rejection, and the process ends;

the network side may send the rejection information to the UE and indicates the reasons for rejection within the time period of Ti; the reasons for rejection comprise but not limited to: the network side has downlink data to send.

After receiving the rejection information, the UE is not allowed to send the same request information again for a period of time, and the period of time is set and notified to the UE in advance by the network side.

In step 805, it is to judge whether the periodic location update timer expires or not, if yes, proceeding to step 806, otherwise proceeding to step 809;

preferably, the value of the periodic location update timer is less than or equal to the value of the power-saving timer; the location update comprises any one of the following: Tracking Area Update (TAU), Routing Area Update (RAU) or Locating Area Update (LAU).

In step 806, the UE exits the power-saving state and performs a location update;

the periodic location update timer of the UE expires, the UE exits the power-saving state and enters into the connected state and performs a location update. After the UE performs the location update, the network side updates the context information of the UE.

In step 807, it is to judge whether the power-saving timer expires or not, if yes, proceeding to step 808, otherwise proceeding to step 809;

preferably, the power-saving timer is greater than or equal to the value of the periodic location update timer; the power-saving timer is running in both the UE and the network side; if the UE performs a periodic location update or sends a service request before the power-saving timer expires, the corresponding power-saving timer will not stop.

In step 808, the UE enters into the idle state, and the process ends;

the UE enters into the idle state after the power-saving timer expires; in this case the power-saving timer at the network side expires at the same time, and the network side can send downlink data to the UE.

In step 809, whether the UE needs to send a service request or not, and if yes, it is to proceed to step 810, otherwise proceed to step 805;

if the UE has no uplink data to send, the UE may continue to stay in the power-saving state until the location update timer or the power-saving timer expires.

In step 810, the UE enters into the connected state and sends a service request to the network side, and it is to proceed to step 805 after the service request process ends.

In the example, if the UE has uplink data to send, the UE enters into the connected state and sends a service request to the network side, establishes a user plane bearer and sends data to the network side; when the service request process ends, the UE continues to stay in the power-saving state until the location update timer or the power-saving timer expires.

Application Example 2

Figure 9:
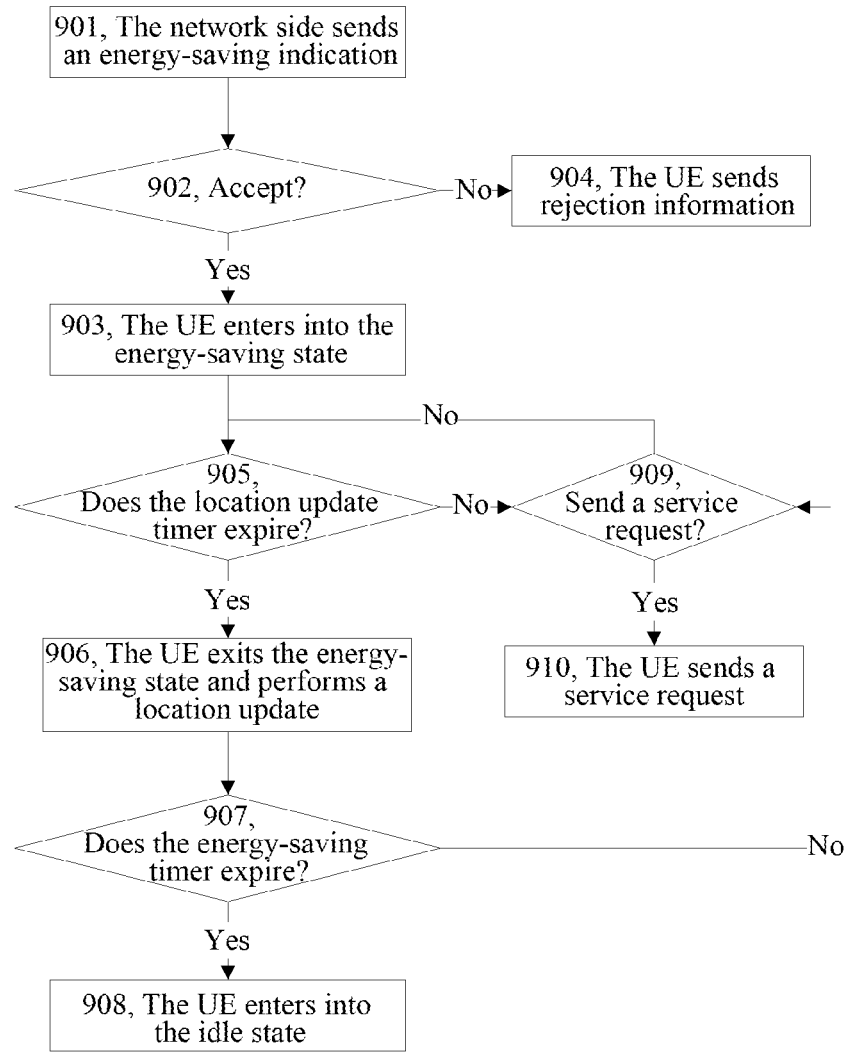
FIG. 9 is a flow chart of a second application example in accordance with the patent document.

This example is for a scenario in which the network side sends a power-saving indication to the UE, and the power-saving method is shown in FIG. 9, comprising:

in step 901, the network side sends power-saving indication information to the user equipment (UE);

the network side may send the power-saving indication information to the UE via a RRC signaling; the RRC signaling is system information or a dedicated RRC signaling; the power-saving indication information comprises one or more of the following information: UE identifier, power-saving state enabling identifier and time period of power-saving state. The UE identifier may be the identifier of a specific UE or the identifiers of a group of UEs. If the power-saving indication information does not have the UE identifier, the corresponding UEs are all the UEs which receive the RRC signaling; the time period of power-saving state is configured and sent to the UE in advance by the network side, and if the power-saving indication information does not have the time period of power-saving state, then the default time period of power-saving state will be selected, and the default time period of power-saving state is configured and notified to the UE in advance by the network side.

In step 902, the UE judges whether to enter into the power-saving state or not, if yes, it is proceed to step 903, otherwise proceed to step 904;

the UE judges whether to enter into the power-saving state or not according to its own needs, if the UE has uplink data to send, or the UE is performing a location update, the UE does not enter into the power-saving state.

In step 903, the UE enters into the power-saving state; this step is the same as step 803 and is not repeated here.

In step 904, the UE sends rejection response information and indicates the reasons for rejection, and the process ends.

The UE may send the rejection information to the network side via the RRC signaling, and the reasons for rejection comprise but not limited to: the UE has uplink data to send.

It should be noted that, when the UE rejects to enter into the power saving mode, the UE may initiate a request to enter into the power-saving state as needed, the specific step is as what is described in step 801.

In step 905, the UE judges whether the periodic location update timer expires or not, if yes, it is to proceed to step 906, otherwise proceed to step 909;

This step is the same as step 805 and is not repeated here.

In step 906, the UE exits the power-saving state and performs a location update;

this step is the same as step 806 and is not repeated here.

In step 907, it is to judge whether the power-saving timer expires or not, if yes, it is to proceed to step 908, otherwise proceed to step 909;

this step is the same as step 807 and is not repeated here.

In step 908, the UE enters into the idle state, and the process ends;

this step is the same as step 808 and is not repeated here.

In step 909, whether the UE needs to send a service request or not, if yes, it is to proceed to step 910, otherwise proceed to step 905;

this step is the same as step 809 and is not repeated here.

In step 910, the UE enters into the connected state and sends a service request to the network side, and it is to proceed to step 905 after the service request process ends.

This step is the same as step 810 and is not repeated here.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The patent document is not limited to any specific form of hardware and software combinations.

Of course, the patent document may have a variety of other embodiments, and without departing from the spirit and essence of the patent document, a person skilled in the art can make various corresponding changes and modifications according to the present invention patent document, and these corresponding changes and modifications should belong to the protection scope of the appended claims of the present invention present document.

INDUSTRIAL APPLICABILITY

The embodiments of the present invention can be used to reduce power consumption of UEs, reduce the signaling interaction between a UE and a network side, and achieve power-saving needs.

What is claimed is:

1. A power-saving method, comprising:
 a user equipment (UE) requesting to enter into a power-saving state, or a network-side network element indicating the UE to enter into the power-saving state;
 the UE entering into the power-saving state, wherein the power-saving state refers to a state in which the UE cannot respond to paging information sent by a network side but can send a service request and perform a periodic location update.

2. The method of claim 1, further comprising: a UE in the power-saving state exiting the power-saving state and sending the service request to the network-side network element when having uplink data or signaling to be sent.

3. The method of claim 2, further comprising: when a periodic location update timer expires, the UE in the power-saving state exiting the power-saving state and performing a location update, and reentering into the power-saving state after the location update is completed.

4. The method of claim 1, further comprising: when a periodic location update timer expires, a UE in the power-saving state exiting the power-saving state and performing a location update, and reentering into the power-saving state after the location update is completed.

5. The method of claim 1, wherein
the UE requesting to enter into the power-saving state comprises: the UE sending power-saving request information to the network-side network element, wherein the power-saving request information is used for requesting to enter into the power-saving state.

6. The method of claim 1, wherein
the network-side network element indicating the UE to enter into the power-saving state comprises: the network-side network element sending power-saving indication information to the UE, wherein the power-saving indication information is used for indicating the UE to enter into the power-saving state.

7. The method of claim 1, wherein
after the UE enters into the power-saving state, the method further comprises: the UE entering into an idle state after a power-saving state timer expires.

8. The method of claim 1, wherein
the UE entering into the power-saving state comprises: the UE staying in an idle state for a preset time period and then entering into the power-saving state, wherein the preset time period is configured and notified to the UE by the network-side network element.

9. A user equipment (UE) for implementing saving power, comprising hardware performing instructions stored in a non-transitory computer readable medium which executes steps in following modules: a sending module, a receiving module and a processing module, wherein:
the sending module is configured to send power-saving request information to a network side to request to enter into a power-saving state;
the receiving module is configured to receive power-saving indication information sent by a network-side network element to a UE;
the processing module is configured to make the UE enter into the power-saving state, wherein the power-saving state refers to a state in which the UE cannot respond to paging information sent by the network side but can send a service request and perform a periodic location update.

10. The UE of claim 9, wherein
the processing module is further configured to make the UE exit the power-saving state and send the service request to a network-side network element when a UE in the power-saving state has uplink data or signaling to be sent.

11. The UE of claim 10, wherein
the processing module is further configured to: after a periodic location update timer expires, make the UE in the power-saving state exit the power-saving state and perform a location update, and make the UE re-enter into the power-saving state after the location update is completed.

12. The UE of claim 9, wherein
the processing module is further configured to: after a periodic location update timer expires, make a UE in the power-saving state exit the power-saving state and perform a location update, and make the UE re-enter into the power-saving state after the location update is completed.

13. The UE of claim 9, wherein
the processing module is further configured to make the UE enter into an idle state after a power-saving state timer expires.

14. The UE of claim 9, wherein
the processing module is configured to make the UE enter into the power-saving state, comprising: the processing module being configured to make the UE stay in an idle state for a preset time period and then enter into the power-saving state, wherein the preset time period is configured and notified to the UE by a network-side network element.

15. A network-side network element for implementing saving power, comprising a configuring module and a storing module, wherein:
the configuring module is configured to set time of a power-saving state timer for a user equipment (UE);
the storing module is configured to store context information of the UE when the UE is in a power-saving state.

16. The network-side network element of claim 15, wherein
the network-side network element further comprises a sending module, which is configured to send power-saving indication information to the UE, wherein the power-saving indication information is used for indicating the UE to enter into the power-saving state.

* * * * *